United States Patent [19]

Strimple et al.

[11] 3,845,706

[45] Nov. 5, 1974

[54] APPARATUS FOR CONTINUOUSLY MEASURING TEMPERATURE IN A FURNACE

[75] Inventors: Robert A. Strimple, Hellertown; George L. McCall; Robert L. Walker, both of Harrisburg, all of Pa.

[73] Assignee: Bethlehem Steel Corporation, Bethlehem, Pa.

[22] Filed: Jan. 15, 1973

[21] Appl. No.: 323,688

Related U.S. Application Data

[63] Continuation-in-part of Ser. No. 237,164, March 22, 1972, abandoned.

[52] U.S. Cl. .................................. 73/359, 136/230
[51] Int. Cl. ............................................. G01k 7/04
[58] Field of Search ...... 73/359; 136/230, 233, 228, 136/236

[56] References Cited
UNITED STATES PATENTS

| 2,504,764 | 4/1950 | Vollrath | 136/230 |
| 2,805,272 | 9/1959 | Postal | 136/228 |
| 2,941,192 | 6/1960 | Postal | 126/236 |
| 2,945,196 | 7/1960 | Shanley | 338/28 |
| 2,981,775 | 4/1961 | Bachman | 136/236 |
| 3,451,861 | 6/1969 | Gordon et al. | 136/230 |
| 3,493,949 | 2/1970 | Servos | 73/259 |
| 3,554,816 | 1/1971 | Moen | 136/233 |

FOREIGN PATENTS OR APPLICATIONS 1,070,511  6/1967  Great Britain ..................... 136/230

OTHER PUBLICATIONS

Bulletin TT-318, "Insulated Thermocouple and Extension Wire," Trinity Equipment Corp, 1962, p. 1,234.

Primary Examiner—S. Clement Swisher
Attorney, Agent, or Firm—Joseph J. O'Keefe; Charles A. Wilkinson; John S. Simitz

[57] ABSTRACT

A device for continuously measuring the temperature of the hot face of a refractory which lines the wall of an electric arc furnace including a pair of dissimilar wires, for example, platinum-platinum/rhodium alloy, constituting a thermocouple in a container and separated from the container by a powdered refractory material. The container can be a cylindrical insulating sleeve. The thermocouple inside the sleeve is at least partially insulated with a glass material.

10 Claims, 9 Drawing Figures 3,845,706

APPARATUS FOR CONTINUOUSLY MEASURING TEMPERATURE IN A FURNACE

CROSS-REFERENCES TO RELATED APPLICATIONS

This is a continuation-in-part of application Ser. No. 237,164, filed Mar. 22, 1972 in the name of Robert A. Strimple, George L. McCall and Robert L. Walker entitled "Apparatus for Continuously Measuring Temperature in a Furnace."

BACKGROUND OF THE INVENTION

This invention in general is directed to a device for continuously measuring temperature in a metallurgical furnace. More specifically, the invention is directed to a device which can be embedded in a refractory which lines the wall of an electric arc furnace whereby the temperature of the hot face of the refractory lining can be continuously measured.

Melting and refining steel in a metallurgical furnace for example an electric arc furnace, basic oxygen furnace or the like requires the use of high temperatures, for example, 2,700° to 2,900° F. The hearth, walls and roof of the furnace are constructed of refractory material which has good resistance to the high temperatures. However, the refractory lining does gradually erode over a period of time and must be replaced. To keep the cost of producing steel to a minimum, every effort is expended to extend the life of the refractory lining. Excessively high temperatures cause rapid erosion and premature failure of the refractory lining, while a rapid rise in temperature causes cracking and spalling of the refractory lining in the furnace because of thermal shock. Both of these conditions must be avoided.

The refractory lining in an electric arc furnace is particularly vulnerable to exposure to excessively high temperatures caused by high power input at the start of melting and arcing between the carbon electrodes and the scrap metal charged into the furnace. The high power concentration where the arc meets the scrap causes instantaneous vaporization of the metal. A highly ionized gas of extremely high temperature is formed and begins to flow outwardly. The flow of the gases from the electrode to the refractory lining of the furnace has a detrimental effect on the refractory lining. Hot spots are formed in the contact areas of the refractory lining resulting in selective rapid erosion and spalling of the refractory lining in these areas. The areas of the refractory lining between the hot spots erode at a much slower rate. Generally, some scrap is placed between the electrodes and the refractory lining to prevent exposure of the lining to the excessively high temperatures. However, during melting it is not possible to see the dissipation of the scrap so placed. When arcing does occur the refractory lining can be exposed to the excessively high temperatures. The refractory lining is then subject to premature failure because of rapid erosion and spalling. The operator of the furnace should have knowledge of the temperatures in the furnace so that he can control the power input to the furnace.

Prior art practices used to measure the temperature in a furnace include the use of a thermocouple encased in a protective sheath as exemplified in U.S. Pat. No. 3,307,401 issued Mar. 7, 1967 to George S. Bachman entitled "Element for Measurement of Furnace Wall Thickness and Temperature." However, temperature measurements at the hot face of the refractory lining obtained by the use of the thermocouple described therein are intermittent, and excessively high temperatures can occur unexpectedly, resulting in excessive erosion and early failure of the refractory lining without the operator of the furnace being aware of the difficulty.

Radiation pyrometers have also been used to detect the temperature of the hot face of the refractory lining but the temperatures so obtained are erratic because of interference caused by the atmosphere in the furnace. It is also difficult to obtain a sight hole in the refractory lining which can be kept clear for an unobstructed view into the furnace.

Several types of devices to detect and record high temperatures by the use of semiconductor materials, as exemplified in U.S. Pat. No. 2,805,272 issued Sept. 3, 1957 to R. H. Postal entitled "Cable-Type Thermocouple and Circuit," have been developed. These devices use a material which has an inverse temperature resistance characteristic, that is, it will not conduct an electric current at low temperatures but will conduct an electric current at high temperatures. While these devices are fairly satisfactory at high temperatures they are not useful at relatively low temperatures. As a result, rapidly increasing temperatures within low temperature ranges are not detectable with these devices.

The refractory lining in a metallurgical furnace, such as an electric arc furnace, basic oxygen furnace or the like, is susceptible to spalling as a result of thermal gradients which occur between the hot face of the refractory lining and the interior of the refractory lining. Hence, rapidly rising temperatures within even low temperature ranges such as exist during heating up of basic oxygen and electric arc type metallurgical furnaces can cause spalling of the refractory lining of such furnaces. Since the prior art temperature detection devices such as shown in U.S. Pat. No. 2,805,272 are not useful at relatively low temperatures, there can be no meaningful operator control of the heating rate in the metallurgical furnace at low temperatures if such devices are used and the refractory lining can fail prematurely because of excessive cracking and spalling.

It is an object of this invention to provide a device to continuously measure the temperature of the hot face of the refractory lining in a furnace both at relatively high temperatures and relatively low temperatures.

It is an additional object of this invention to provide a device to continuously measure the temperature of the hot face of a refractory lining in a furnace, which device remains substantially the same length as the thickness of the refractory wall and has a useful life commensurate with the life of the refractory lining.

It is a further object of this invention to provide a device to continuously measure the temperature of the hot face of the refractory lining in a furnace which device relies on the electrical conductivity of a refractory material to complete the electric circuit required to measure and record the temperature.

It is a still further object of this invention to provide a device for continuously measuring the temperature of the hot face of the refractory lining in an electric arc furnace wherein a junction is formed between two thermocouple wires, initially insulated from each other by glass material, in the presence of refractory material, for example chrome ore or chromium oxide and admixtures thereof.

SUMMARY OF THE INVENTION

Broadly, the device of the invention includes a pair of dissimilar wires insulated from each other by a glass material and constituting a thermocouple positioned centrally in a container by a refractory material packed into the container. The device can be embedded in a refractory lining of a furnace to continuously measure the temperature of the hot face of the refractory lining of the furnace.

DETAILED DESCRIPTION OF THE INVENTION

Figure 1:
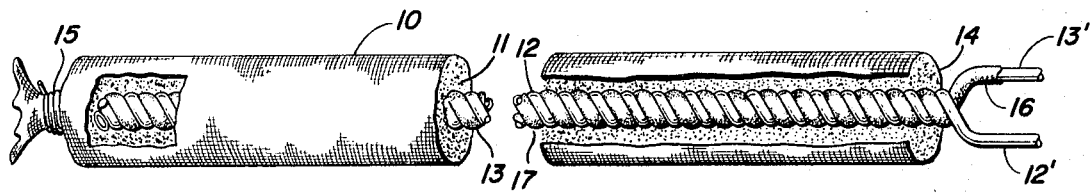
FIG. 1 is a cross-sectional longitudinal view of the device of the invention.

Referring to FIG. 1, the preferred configuration of the device of the invention includes an outer sleeve 10, a powdered refractory material 11 packed into the outer sleeve 10 and a pair of dissimilar wires 12 and 13 located inside the outer sleeve 10 and separated therefrom by the powdered refractory material 11. At least one of the wires is insulated with a glass insulating material 16, such as a fiberglass sleeve.

The outer sleeve 10 has one open end 14 and one closed end 15. The outer sleeve 10 can be made of a metallic or non-metallic material, for example, stainless steel or fiberglass, so long as it is of sufficient rigidity and strong enough to contain the refractory powder. The pair of dissimilar wires 12 and 13 can be made of any well known thermocouple pairs, such as platinum-platinum/rhodium alloys. One such thermocouple pair is platinum vs. platinum/13 percent rhodium alloy. Wire 13 is shown encased in an insulating outer covering 16 which is formed of a glassy material. It is preferred to use fiberglass in the form, for example, of a fiberglass sleeve. It must be understood that either or both of the wires can be encased in an insulating outer cover. One end of wire 12 and one end of wire 13 are joined together, for example by welding, soldering or braiding, to form a unit structure 17 which is inserted into the outer sleeve 10. The unit structure 17 extends at least the length of the outer sleeve 10. The powdered refractory material 11 is packed around the unit structure 17 and separates the unit structure 17 from the outer sleeve 10. The powdered refractory material 11 can be chrome ore, chromium oxide or admixtures thereof and can have a particle size as coarse as +1/8 of an inch (Tyler Sieve) and can be fine enough to pass a −325 mesh (Tyler Sieve). The coarser particles can be used to achieve the results of the invention, however compacting the coarser sizes is difficult and a dense packing difficult to achieve. The finer particles can be used to achieve the results of the invention, but handling of the fine powder is difficult. It is, therefore, preferred to use a refractory packing which has a particle size in the range of about −28 to about +325 mesh (Tyler Sieve). A typical screen analysis of a powdered refractory material suitable for use in the device of the invention is as follows:

| Type Screen Series | % Particles Retained |
| --- | --- |
| 30 | 0.03 |
| 40 | 0.30 |
| 50 | 3.90 |
| 70 | 12.80 |
| 80 | 5.82 |
| 100 | 7.77 |
| 150 | 9.93 |
| 200 | 23.23 |
| 270 | 2.10 |
| 325 | 1.78 |
| PAN | 32.70 |

Chrome ore and chrome oxide are refractory materials which ordinarily do not conduct an electric current at temperatures below about 2,000° F. At temperatures above about 2,000° F. the refractory materials become electrically conductive. However, the materials remain refractory and resistant to erosion at the temperatures encountered in an electric arc furnace. Typical analyses of a chrome ore and a chrome oxide which can be used in the device of the invention are shown below:

| Chrome Ore | | Chrome Oxide |
| --- | --- | --- |
| $Cr_2O_3$ | − 39% | Substantially all $Cr_2O_3$ |
| FeO | − 23% | with less than 1.00% |
| $Al_2O_3$ | − 18% | total impurities. |
| MgO | − 10% | |
| $SiO_2$ | − 9% | |
| CaO | − 1% | |

As noted above, the refractory materials, chrome oxide and chrome ore, are electrically conductive when heated to temperatures above about 2,000° F. It is, therefore, not necessary to physically join the wires of the thermocouple to form a "hot junction" whereby the induced EMF will be transmitted in the wires. As noted above, chrome oxide and chrome ore do not ordinarily conduct an electric current at temperatures below about 2,000° F. Therefore, it is preferred that the thermocouple wires be physically joined, for example, by welding when the device is made in order to allow initial temperature detection at a lower temperature. The electromotive force (EMF) generated in the wires, because of the temperature of the environment, is transmitted by the material forming the junction between the wires of the thermocouple. The free ends 12′ and 13′ of the dissimilar wires are connected to a recorder (not shown) to record the temperature of the hot face of the refractory wall in the furnace.

Unexpectedly, it has been found that as the temperature of the hot face of the refractory lining decreases during the latter stages of a heat and during the cooling off period which occurs as the furnace is recharged with raw materials, the device of the invention continues to be operational and a continuous recording of the temperature of the hot face of the refractory lining is realized even when the temperatures are lower than about 2,000° F. and as low as ambient temperature. The mechanism by which the induced EMF is transmitted is not known. However, it is believed that when the device of the invention is exposed to relatively high temperatures, the glass insulating sleeve surrounding at least one of the thermocouple wires, when heated in the presence of the chrome oxide or chrome ore reacts with or is caused to form a conductor path that is independent of temperatures. Hence, temperatures within the range of ambient temperature to 1,500° F. can be monitored and the heating rate of the metallurgical furnace controlled to prevent spalling of the refractory lining in the furnace.

While I have described the device of the invention in FIG. 1, it must be understood that other variations of the device as shown in FIGS. 2 to 8 can be used.

Figure 2:
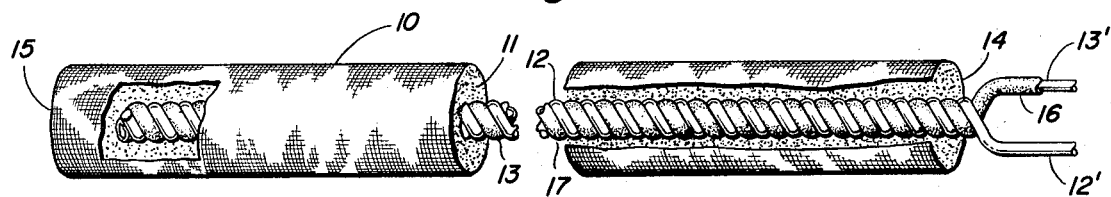
FIGS. 2 to 8 are variations of the device shown in FIG. 1.

FIG. 2 is the same configuration as FIG. 1 with the exception that the normally closed end 15 is left open. Of course, the normally open end 14 can be closed in which case the device can have two closed ends 14 and 15 or normally closed end 15 can be left open and normally open end 14 is closed. This variation can be applied to the following configurations of the device of the invention.

Figure 3:
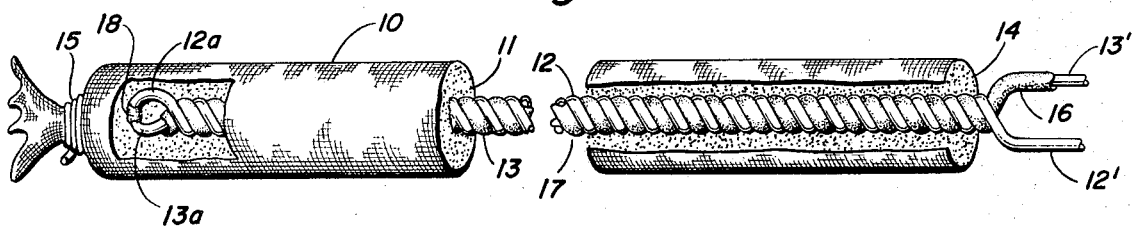

FIG. 3 is the same configuration as FIG. 1 except that the ends 12a and 13a of the thermocouple wires 12 and 13 are physically joined, for example, by welding, forming a joint 18.

Figure 4:
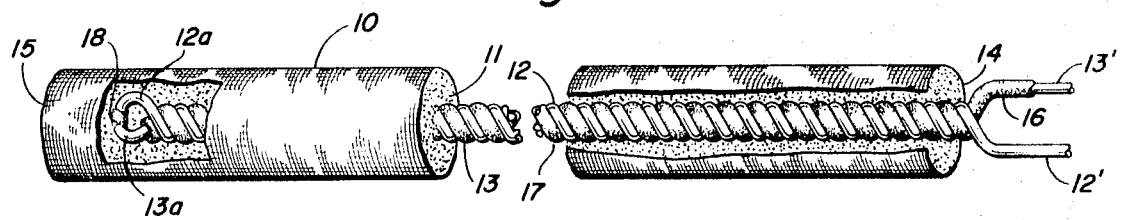

FIG. 4 has the same configuration as FIG. 3 except that the normally closed end 15 of the outer sleeve 10 is left open.

Figure 5:
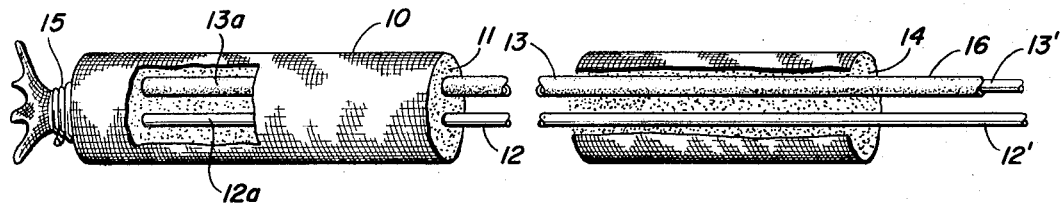

FIG. 5 shows a variation of the device in which the wires 12 and 13 are in spaced relationship in the outer sleeve 10 and separated from the outer sleeve 10 and each other by the refractory material 11. The wires 12 and 13 do not have the ends 12a and 13a physically connected.

Figure 6:
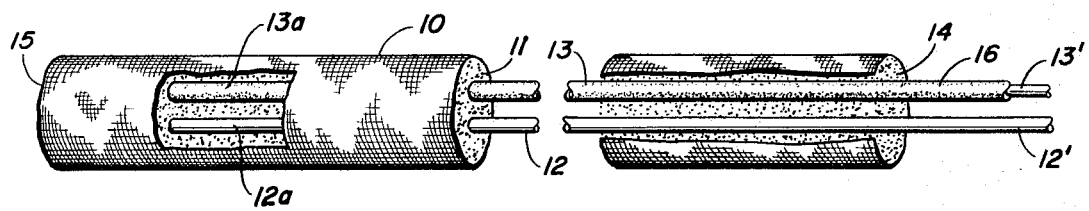

FIG. 6 is the same as FIG. 5 except that the end 15 of the outer sleeve 10 is open.

Figure 7:
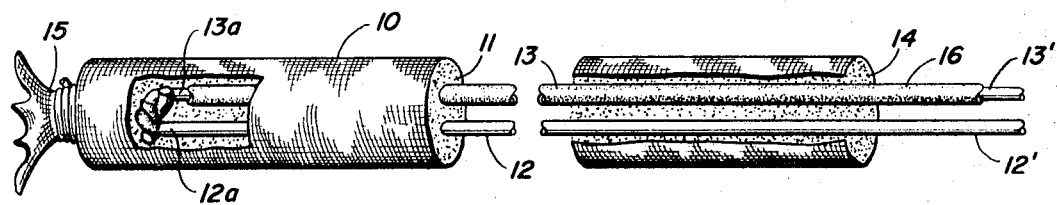

FIG. 7 shows two parallel thermocouple wires the same as FIG. 5 in which the ends 12a and 13a are physically joined, for example, by welding.

Figure 8:
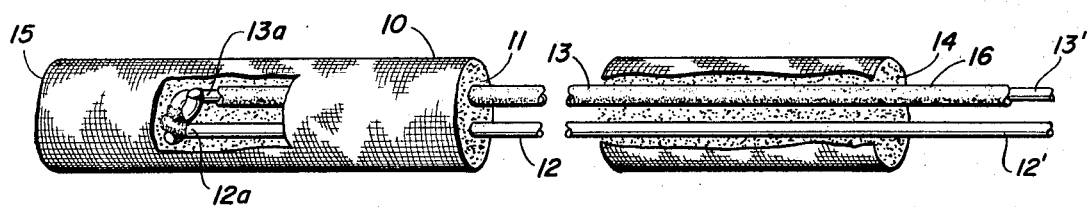

FIG. 8 is the same as FIG. 7 except the end 15 of the outer sleeve 10 is left open.

The variations of the device shown above are made by packing dry powdered refractory material around thermocouple wires contained inside an insulating sleeve. The compacting of the powdered refractory material keeps the particles in position in the device. We postulate that the particles in the end of the device which is near the hot face of the refractory wall are sintered together by the heat in the furnace, thus forming a substantially rigid end to prevent the particles of the powdered material from falling out of the device. We have found that by placing the open ended devices on a solid plate, for example a steel plate, and by pressure compacting the particles in the device, a substantially uniform rigid structure is formed and the particles remain in the device. We have also found that the device can be made by applying a wet coating of the powdered refractory material to the thermocouple wires after they have been formed into a unit structure. The thermocouple wires are formed into a unit structure as previously described and shown in FIG. 1. One of the thermocouple wires is encased in an insulating glass sleeve, as noted previously. The thermocouple wires are then dipped several times into an aqueous slurry of the powdered refractory material. The number of dips is determined by the thickness of coating desired. We have found that a wet coating thickness of about 3/32 of an inch is sufficient to produce the device. The dry coating thickness is about 1/16 of an inch. The coated thermocouple wires are then inserted into a heat-shrinkable thermoplastic sleeve, such as "Alpha Fit" which is a polyolefin type thermoplastic material. The device is heated to a temperature, for example, 200° F., for a time to cause the thermoplastic sleeve to shrink tightly around the coated thermocouple wires. We have found that a slurry consisting of about 60 percent chrome oxide and 40 percent water is satisfactory to apply a coating of the desired thickness onto the surfaces of the thermocouple wires. Of course, a slurry containing more or less than 60 percent chrome oxide can be used so long as the consistency of the slurry allows a uniform coating to be formed on the surfaces of the thermocouple wires. The consistency of the slurry should not be so great that a thick non-flowing coating is formed on the surfaces of the thermocouple wires.

A dispersent can be added to the slurry to aid in obtaining uniform dispersion of the chrome oxide in the water thereby aiding in applying the wet powdered refractory material to the surfaces of the unit structure. Substantially all the particles of the powdered refractory chrome oxide used to form the slurry should pass a 325 mesh sieve size.

It is preferable to have the thermocouple wires twisted into contact with each other at the end as shown in FIGS. 1–4 and 7–8 since this ensures that the initial temperatures of the lining can be monitored from ambient temperature all the way up to operating furnace temperature. In the embodiment of the invention shown in FIGS. 5 and 6, on the other hand, the first heat in the furnace can be monitored only in the higher or operating temperature ranges in the heating up cycle of the initial furnace heats in a newly relined furnace. Once the furnace has reached a temperature at which the high temperature junction is formed, however, the lining temperatures may then be measured all the way down to ambient temperatures as the furnace cools. When the furnace is again heated, the lining temperature can then be measured from ambient temperature up to operating temperature.

If it is desired to use the embodiment of the invention shown in FIGS. 5 and 6 to measure the initial heat of a furnace from ambient temperature to operating temperature during initial heat up of the furnace, the thermocouple can be preheated to operating temperatures, or at least to 1,600° to 2,000° F., prior to being installed in the furnace lining. An initial thermocouple junction will be established by such heating. Such preheating can be accomplished in a laboratory muffle furnace or the like. It is, of course, much easier to just twist the ends of the couple together to establish an initial thermocouple junction shown in FIGS. 7 and 8.

It is preferred to use the completely twisted thermocouple shown in FIGS. 1 through 4. If the straight wire type thermocouple is used, the wires should be fairly close together.

Figure 9:
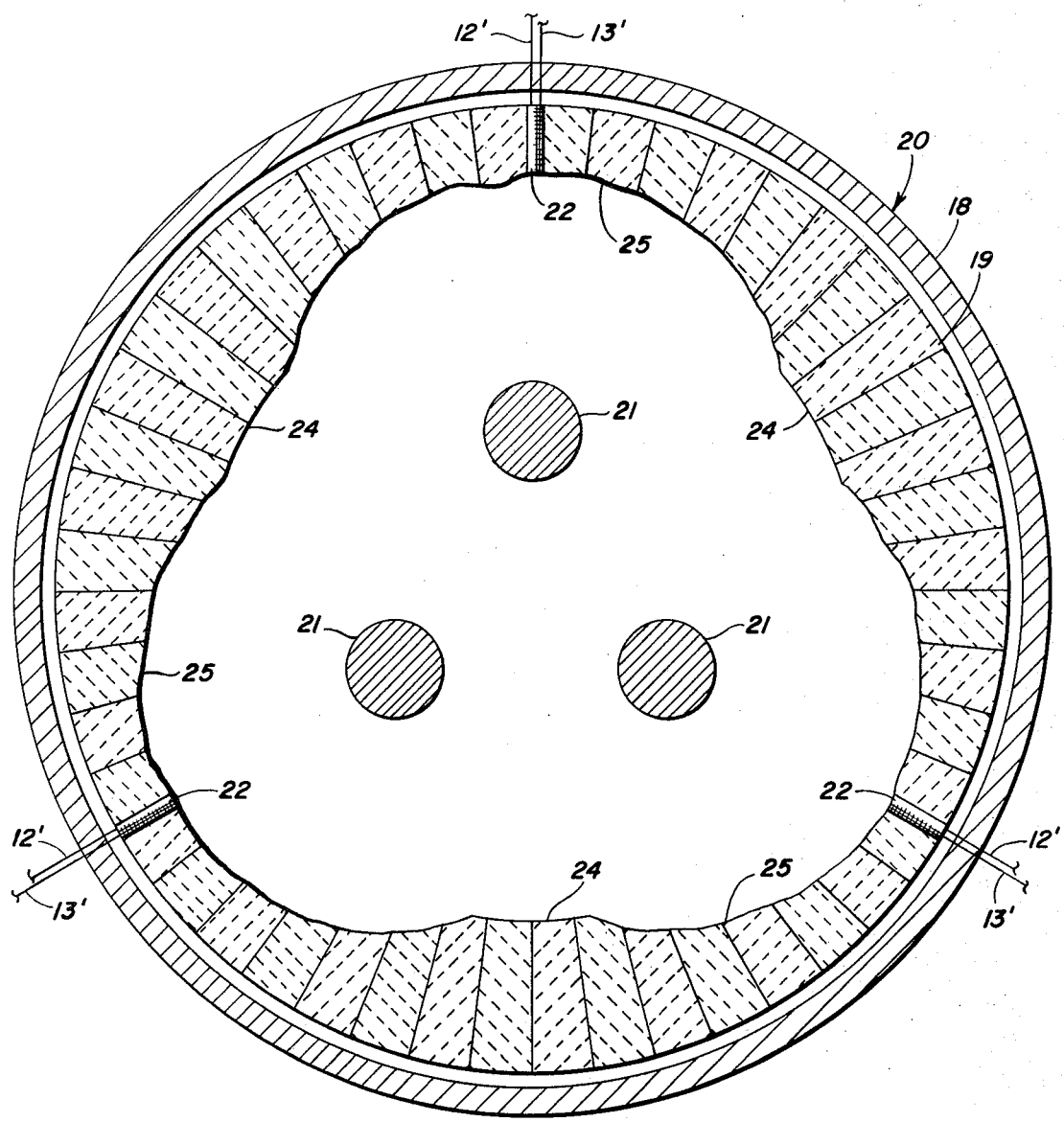
FIG. 9 is a top-sectional view of an electric arc furnace with the device of the invention in place in the refractory lining of the furnace.
Figure 9:
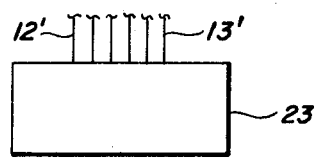

Referring now to FIG. 9, which is a top view of an electric arc furnace 20 after several heats of a campaign have been melted. The furnace 20 has a steel outer shell 18 and a refractory lining 19 supported by the shell 18. The carbon electrodes 21 which provide the necessary electrical energy for melting and refining are shown extending downwardly into the furnace 20. The devices of the invention are shown at 22 in the refractory lining of the furnace. The free ends of the wires 12' and 13' are shown extending outwardly through the shell 18 of the furnace and are connected to a common recorder 23. Portions of the original hot face of the refractory lining are shown at 24. The areas shown at 25 represent portions of the refractory lining 19 which have been eroded during melting and refining of steel. Note that the areas 25 roughly form an arc of a circle which can have one of the electrodes 21 as the center. The areas 25 spaced 120° apart are exposed to high temperatures caused by arcing between the electrodes and charged scrap metal. Therefore, it is desirable to know the temperatures on the hot face of the refractory lining adjacent the electrodes 21. The device 22 of the invention is placed in the refractory lining of the furnace during the construction thereof. The devices 22 are spaced 120° apart and are opposite the electrodes 21 of the furnace. It will be noted that as the refractory lining 24 has eroded, the device 22 also has eroded. The device continuously measures the temperature of the hot face of the refractory lining.

In operation, an electric arc furnace is charged with the usual scrap. Light or medium scrap is charged in a thin layer on the bottom or hearth of the furnace. Heavy scrap is charged in the area adjacent to the triangle formed by the electrodes. Light or medium scrap is piled high around the sides of the furnace to protect the refractory lining from the arc between the electrodes and the scrap during initial melt down at high energy input. The charge melts from the bottom up since any scrap which melts on the initial power input flows down the electrodes and forms a pool in the bottom of the furnace. The light and medium scrap at the bottom melts into the pool of molten metal. The charge is melted by the electric arc, radiation from the molten metal and resistance to the current offered by the scrap. The scrap piled around the sides of the furnace either melts or slips downwardly, exposing the refractory lining to the heat in the furnace. The rapid rise in the temperature of the hot face of the refractory lining is "seen" by the device of the invention. The temperature is recorded and the furnace operator can cut back the power input to prevent overheating in the furnace.

While we have shown the device of the invention in a refractory lining of an electric arc furnace, it will be understood that the device can be used in any portion of the refractory lining including the roof and hearth, if so desired.

By chrome ore we mean an ore having a typical chrome oxide analysis as $Cr_2O_3$ of about 30 percent to 50 percent as illustrated in the following table of analyses.

the chrome ore-chrome oxide refractory mixture more closely approaching the analysis of pure chrome oxide.

We claim:

1. A device for continuously monitoring the temperature of the hot face of a refractory lining in a metallurgical furnace, comprising:
   a. holding means,
   b. temperature sensing means comprising a pair of dissimilar wires physically joined at one end contained within said holding means and connected to an external recording device; one of said dissimilar wires being encased in a glass insulator sleeve, and
   c. at least one powdered refractory material taken from the group consisting of chrome ore and chrome oxide, packed within said holding means to separate said holding means from said temperature sensing means.

2. The device of claim 1 in which the holding means of subparagraph (a) is a generally cylindrical sleeve having an inner end and an outer end, the inner end being flush with the hot face of the refractory lining.

3. A device as claimed in claim 2 in which the inner end is closed and the outer end is open.

4. A device as claimed in claim 2 in which both ends are open.

5. A device as claimed in claim 2 in which both ends are closed.

6. A device as claimed in claim 1 in which the temperature sensing device is a thermocouple consisting of two wires of platinum-platinum/rhodium alloy, said wires having their inner ends physically joined and their outer ends extending beyond the furnace to a recording means, one of said wires being encased in a glass insulating sleeve.

7. A device as claimed in claim 1 in which the powdered refractory material is chrome ore.

8. A device for continuously measuring the temperature of the hot face of a refractory lining of a furnace, comprising:
   a. a temperature sensing means comprising a pair of dissimilar wires physically joined at one end and having at least one wire encased in a glass insulating sleeve, and formed into a unit structure, Typical Analyses of Chrome Ores

| Source of Ore | $Cr_2O_3$ | $Al_2O_3$ | FeO* | MgO | CaO | $SiO_2$ | Ignition Loss |
|---|---|---|---|---|---|---|---|
| Cuba | | | | | | | |
| Camaguey | 31.6 | 27.3 | 13.0 | 18.3 | 0.6 | 5.8 | 2.1 |
| Moa Bay | 35.6 | 26.3 | 13.9 | 17.2 | 0.3 | 4.1 | 1.4 |
| Philippine | | | | | | | |
| Masinloc | 32.1 | 29.2 | 12.6 | 18.8 | 0.6 | 5.5 | 1.0 |
| Transvaal | | | | | | | |
| Hard Lump | 41.2 | 16.8 | 26.1 | 9.9 | 0.6 | 3.1 | 0.3 |
| High Grade ** | 48.4 | 13.9 | 22.9 | 10.7 | 0.2 | 2.6 | |
| Rhodesia | | | | | | | |
| Dyke** | 50.7 | 13.0 | 16.4 | 13.2 | 0.8 | 4.3 | 0.9 |
| Dyke ** | 48.5 | 11.5 | 18.3 | 13.4 | 0.1 | 5.6 | 0.9 |
| Turkey | | | | | | | |
| Refractory** | 37.1 | 24.4 | 13.9 | 17.7 | 0.2 | 4.3 | 1.0 |
| Metallurgical** | 48.3 | 13.0 | 14.1 | 16.9 | 1.0 | 5.1 | 1.0 |
| Metallurgical | 44.5 | 16.2 | 11.9 | 19.9 | 0.2 | 3.9 | 1.3 |

* All iron oxide is reported as FeO, however, a small amount is present as $Fe_2O_3$
** From Industrial Minerals and Rocks "", 1960.

Mixtures of chrome ore and chrome oxide will, of course, provide higher percentages of chrome oxide in b. at least one powdered refractory material taken from the group consisting of chrome ore and chrome oxide and mixture thereof coating the surfaces of the temperature sensing means. and
c. a thermoplastic sleeve covering the coated temperature sensing device.

9. The device of claim 8 in which the powdered refractory material of step (b) is chrome oxide.

10. The device of claim 9 in which the temperature sensing device of step (a) is a thermocouple consisting of one platinum wire and one platinum/rhodium alloy wire.

* * * * *